(12) United States Patent
Bassett

(10) Patent No.: US 7,870,827 B2
(45) Date of Patent: Jan. 18, 2011

(54) AGRICULTURAL IMPLEMENT FOR DELIVERING AMMONIA GAS TO SOIL

(75) Inventor: Joseph D. Bassett, DeKalb, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

(21) Appl. No.: 12/511,314

(22) Filed: Jul. 29, 2009

(65) Prior Publication Data

US 2010/0154692 A1    Jun. 24, 2010

Related U.S. Application Data

(60) Provisional application No. 61/140,757, filed on Dec. 24, 2008.

(51) Int. Cl.
*A01C 5/00* (2006.01)
*A01C 13/00* (2006.01)
*A01C 23/00* (2006.01)

(52) U.S. Cl. ............... 111/119; 111/121; 111/168; 111/194

(58) Field of Classification Search ......... 111/118–121, 111/127, 129, 149, 157, 163–196
See application file for complete search history.

(56) References Cited

U.S. PATENT DOCUMENTS

| | | |
|---|---|---|
| 5,852,982 A | 12/1998 | Peter |
| 6,067,918 A | 5/2000 | Kirby |
| 6,453,832 B1 | 9/2002 | Schaffert |
| 6,997,400 B1 | 2/2006 | Hanna et al. |
| 7,290,491 B2 | 11/2007 | Summach et al. |
| 7,523,709 B1 | 4/2009 | Kiest |
| 2006/0102058 A1 * | 5/2006 | Swanson ............ 111/119 |
| 2007/0044694 A1 | 3/2007 | Martin |
| 2008/0236461 A1 * | 10/2008 | Sauder et al. ......... 111/170 |

* cited by examiner

*Primary Examiner*—Christopher J. Novosad
(74) *Attorney, Agent, or Firm*—Nixon Peabody LLP

(57) ABSTRACT

An agricultural implement for delivering ammonia gas to soil includes a soil cutting device for forming a furrow in the soil to be fertilized, a closing device trailing the cutting device for closing the furrow, and an ammonia gas delivery tube extending downwardly into the furrow between the cutting device and the closing device, and then extending rearwardly along the furrow to the closing device for delivering ammonia gas onto at least one wall of the furrow rearwardly of the trailing end of the cutting device and of the leading end of the closing device. A discharge nozzle is mounted on the trailing end of the ammonia gas delivery tube for discharging ammonia gas onto the bottom and/or sides of the furrow. The ammonia gas delivery tube and the discharge nozzle may be made of nonmetallic material, such as polymeric material, to reduce or avoid freezing of soil and moisture on the implement.

14 Claims, 2 Drawing Sheets

AGRICULTURAL IMPLEMENT FOR DELIVERING AMMONIA GAS TO SOIL

CROSS REFERENCE TO RELATED APPLICATIONS

This application claims priority from U.S. Provisional Application No. 61/140,757, filed on Dec. 24, 2008, which is hereby incorporated by reference in its entirety and from which priority is claimed.

FIELD OF THE INVENTION

The present invention relates generally to agricultural equipment and, more particularly, to an implement for injecting ammonia gas into the soil in an agricultural field.

BACKGROUND OF THE INVENTION

One of the common forms of fertilizer used in agricultural fields is ammonia gas, which functions as a nitrogen fertilizer when delivered into the soil. Although ammonia gas has been used as an agricultural fertilizer for many years, problems remain in achieving efficient and effective delivery of ammonia gas into soil before the gas escapes onto the atmosphere. Problems are also caused by the cooling effect caused by expansion of the ammonia gas as it is discharged onto the soil, which causes freezing of soil and moisture on the implement, leading to adverse effects on performance.

SUMMARY OF THE INVENTION

In accordance with one embodiment, an agricultural implement for fertilizing the soil of an agricultural field comprises a soil cutting device for forming a furrow in the soil to be fertilized, a closing device trailing the cutting device for closing the furrow, and an ammonia gas delivery tube extending downwardly into the furrow between the cutting device and the closing device, and then extending rearwardly along the furrow to the closing device for delivering ammonia gas onto at least one wall of the furrow rearwardly of the trailing end of said cutting device and of the leading end of said closing device. The most common cutting devices used in agricultural implements are discs and knives (shanks), either of which may be used in this embodiment of the invention. The closing device may be a closing wheel or any of the many other types of closing devices known and used in agricultural applications.

In one particular embodiment, the trailing end of said ammonia gas delivery tube is located beneath a portion of the closing device, and a discharge nozzle is mounted on the trailing end of the ammonia gas delivery tube for discharging ammonia gas onto at least the bottom of the furrow. The discharge nozzle forms an expansion chamber to allow expansion of the ammonia gas as the gas is discharged from the deliver tube. The nozzle may discharge the gas onto both the bottom and side walls of the furrow. In one implementation, the ammonia gas delivery tube and the discharge nozzle are made of non-metallic material, such as polymeric material, to reduce or avoid freezing of soil and moisture on the implement.

BRIEF DESCRIPTION OF THE DRAWINGS

The invention may best be understood by reference to the following description taken in conjunction with the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 2:
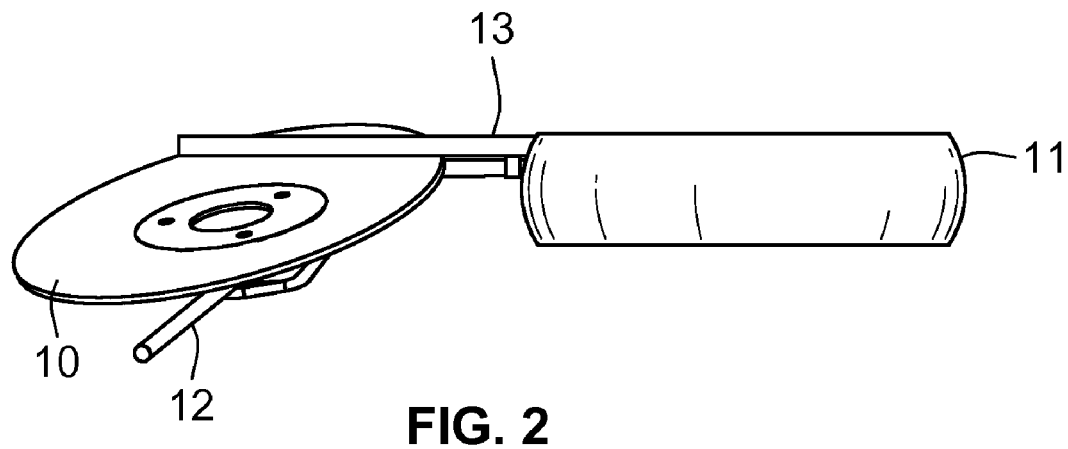
FIG. 2 is a top plan view of the devices shown in FIG. 1.
Figure 1:
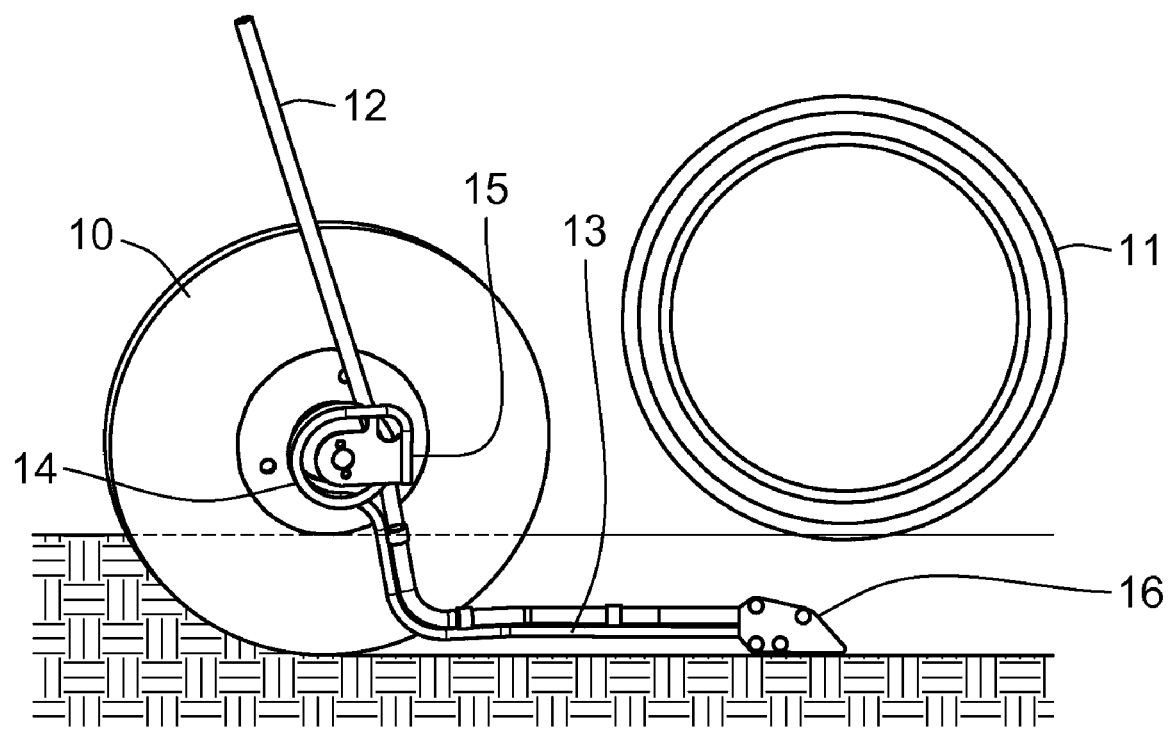
FIG. 1 is a side elevation of a portion of an agricultural planting implement that includes an opener disc, an ammonia delivery tube and a closing wheel.
Figure 3:
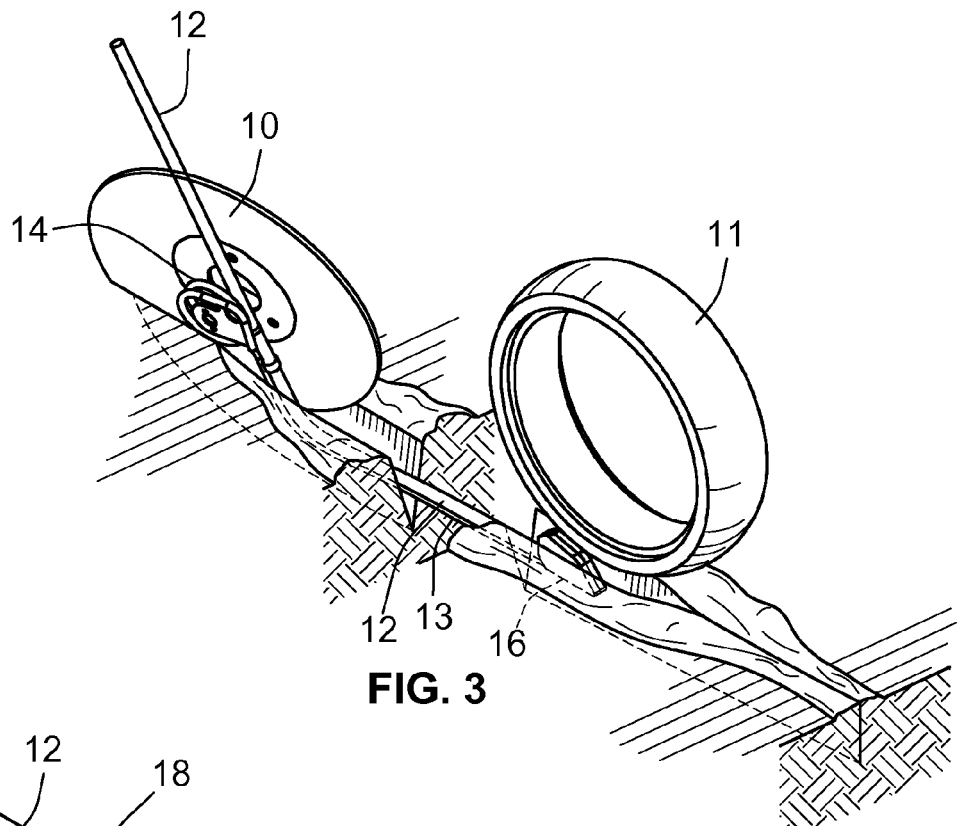
FIG. 3 is a perspective view of the devices shown in FIG. 1.

Turning now to the drawings and referring first to FIGS. 1-3, the illustrative agricultural cultivating and fertilizing implement includes a cutting device such as an opener disc 10 for forming a furrow for receiving fertilizer, and a closing device such as a closing wheel 11 for closing the furrow after fertilizer has been delivered into the furrow. Those working in the agricultural field sometimes use the term "slot" instead of "furrow." Both the opener disc 10 and the closing wheel 11 are mounted on brackets depending from a conventional frame adapted to be towed by a tractor. A portion of a bracket 15 carrying the opener disc 10 is shown in FIG. 1.

The illustrative opener disc 10 is tilted slightly, as can be seen in FIGS. 1-3, but opener discs that are substantially vertical are also used for cutting furrows in soil. The opener disc 10 may be replaced with a conventional knife opener or "shank," and the closing wheel 11 may be replaced with any of a variety of different closing devices that are well known in the agricultural implement industry. Both fertilizer and seeds may be deposited in the furrow before it is closed, when the implement is used as part of a planting operation, or just fertilizer when the implement is used only for fertilizing or cultivating and fertilizing.

Extending downwardly along one side of the opener disc 10 is an ammonia delivery tube 12 for delivering ammonia gas into the furrow formed by the disc 10. The portion of the delivery tube that extends into the furrow is guided and supported by a tine 13 that extends downwardly from the bracket 15 and then bends rearwardly toward the closing wheel 11, preferably overlapping a portion of the closing wheel so that the ammonia is discharged into the furrow just before, or even just after, the furrow is closed. That is, the delivery tube 12 extends rearwardly along the bottom of the furrow to the closing wheel 11 and delivers ammonia gas onto at least one wall of the furrow in the vicinity of where the furrow is closed by the closing wheel. The tine 13 is preferably spring biased toward the bottom of the furrow by a conventional spring 14 mounted on the bracket 15 in which the axle of the opener disc is journaled. Alternatively, the tine itself may be made resilient so that it can be positioned near the bottom of the furrow with the ability to flex upwardly as required by the soil conditions. Also, the tine and the delivery tube may be integrated in a single part. The tine, or the single integrated part, can be made of either metal or polymeric material.

Figure 4:
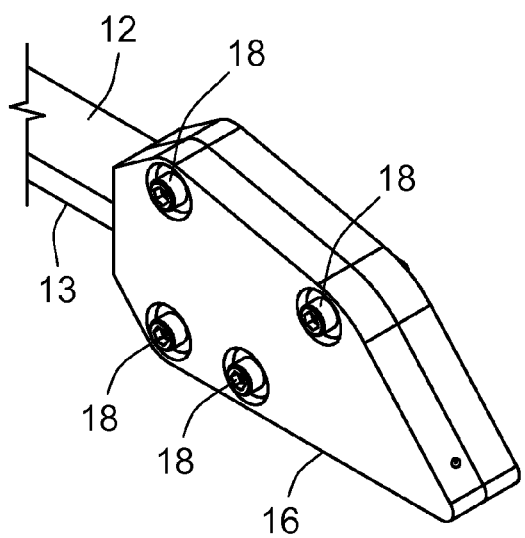
FIG. 4 is an enlarged perspective view of the diffuser tip on the trailing end of the ammonia delivery tube shown in FIGS. 1-3.
Figure 5:
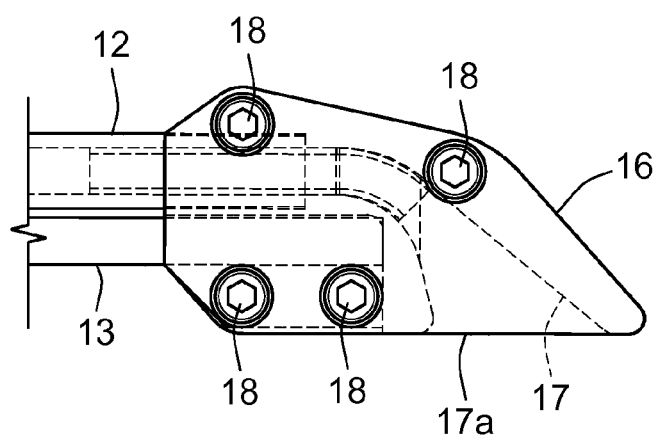
FIG. 5 is a side elevation of the diffuser tip shown in FIG. 4.

A discharge nozzle 16 (see FIGS. 4 and 5) is mounted on the trailing end of the ammonia delivery tube 12 for discharging ammonia gas onto at least the bottom of the furrow formed by the opener disc 10. As can be seen in FIG. 5, the discharge nozzle 16 forms an expansion chamber 17 to allow expansion of the ammonia gas just before the gas is discharged from the nozzle 16. This reduces the velocity at which the gas is discharged, thereby improving absorption of the ammonia in the soil by reducing the amount of ammonia that is deflected off the soil and out of the furrow. The exit opening 17a of the expansion chamber 17 is on the bottom of the nozzle 16 so that the gas is directed onto the bottom wall of the furrow formed by the opener disc 10. Because the tine 13 is biased downwardly, the nozzle 16 is maintained in engagement with the bottom of the furrow so that it is difficult for the pressurized ammonia gas to escape into the atmosphere rather than penetrating into the soil. The chamber 17 may also be provided with side holes to discharge ammonia gas onto the side walls of the furrow, as well as the bottom wall.

The ammonia gas delivery tube 12 and the discharge nozzle 16 are both preferably made of non-metallic material, such as a polymeric material, so that these components have low thermal conductivity. This is desirable because the expansion of the ammonia gas as it is released into the soil typically causes freezing in various conditions of temperature and humidity, and the freezing can have an adverse effect on performance. For example, moisture can become frozen in the gas discharge opening and reduce, or even interrupt, the delivery of ammonia into the soil. Soil and moisture can also freeze on the tine 13 and even on the soil-cutting device, especially when it is a non-rotating device such as a knife or shank. Forming the discharge nozzle and the delivery tube of polymeric material having low thermal conductivity thermally isolates the gas discharge area from the metallic portions of the implement, thereby preventing or at least reducing the freezing of soil and moisture on those metallic portions. For example, the ammonia gas delivery tube may be a polymeric hose, and the discharge nozzle 16 may be formed as a molded plastic clamshell attached to the trailing end of the tine 13 by multiple screws 18.

It will be understood that the ammonia is supplied to the delivery tube 12 from a pressurized tank carried by the implement. If desired, the ammonia from the tank can be fed to a pump that increases the pressure of the ammonia in the delivery tube so that a substantial portion of the ammonia is maintained in liquid form.

It can be seen that the discharge nozzle in the illustrative embodiment is positioned to release the ammonia gas directly below a portion of the closing wheel. This minimizes the tendency of the ammonia to escape as gas in the area between the point where the gas is released from the discharge nozzle and the point where the furrow is closed by the closing wheel 11.

The plastic discharge nozzle 16 is shaped to form a seal against the bottom and/or the sides of the furrow formed by the opener disk 10 (see FIG. 1). The expansion chamber 17 diffuses the ammonia gas so that the gas is exposed to a greater surface area of soil without being allowed to be exposed to the atmosphere. Each unit of soil has a limited capacity to bind with ammonia, and thus increasing the area of soil that can bind with the ammonia, while limiting the ability of the ammonia to escape as gas to the atmosphere, generally improves the performance of the ammonia delivery device.

The implement described above may be used for cultivating and fertilizing a field to be planted later, or in conjunction with a planting implement that has a seed hopper and seed delivery device for depositing seed in the furrow between the cutting device and the closing device.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural implement for delivering ammonia gas fertilizer to the soil of an agricultural field, said implement comprising
    a soil cutting device for forming a furrow in the soil to be fertilized,
    a closing device trailing said cutting device for closing said furrow,
    an ammonia gas delivery tube extending downwardly into said furrow between said cutting device and said closing device, and then extending rearwardly along said furrow to said closing device for delivering ammonia gas onto at least one wall of said furrow rearwardly of the trailing end of said cutting device and of the leading end of said closing device, and
    a discharge nozzle coupled to the trailing end of said ammonia gas delivery tube for discharging ammonia gas onto at least a bottom of said furrow, the discharge nozzle being biased downwardly to maintain engagement with the bottom of said furrow.

2. The agricultural implement of claim 1 in which said discharge nozzle discharges ammonia gas onto both a bottom and side walls of said furrow.

3. The agricultural implement of claim 1 in which said ammonia gas delivery tube and said discharge nozzle are made of non-metallic material.

4. The agricultural implement of claim 3 in which said non-metallic material is polymeric material.

5. The agricultural implement of claim 4 in which said ammonia gas delivery tube is a polymeric hose.

6. The agricultural implement of claim 1 in which said discharge nozzle forms an expansion chamber to allow expansion of ammonia gas as said gas is discharged from said nozzle.

7. The agricultural implement of claim 1 which includes a frame carrying said cutting and closing devices, and a tine mounted on said frame and extending downwardly into said furrow between said cutting device and said closing device, and then extending rearwardly along said furrow for supporting said ammonia gas delivery tube.

8. The agricultural implement of claim 7 in which said ammonia gas delivery tube is attached to said tine.

9. The agricultural implement of claim 1 which includes a seed delivery device for depositing seed in said furrow between said cutting device and said closing device.

10. A method of delivering ammonia gas fertilizer to the soil of an agricultural field, said method comprising
    forming a furrow in the soil to be fertilized with a towed cutting device,
    closing said furrow with a towed closing device trailing said cutting device,
    delivering ammonia gas onto at least one wall of said furrow in the vicinity of where the furrow is closed by said closing device, by an ammonia gas delivery tube extending downwardly into said furrow between said cutting device and said closing device, and then extending rearwardly along said furrow to said closing device, and discharging said ammonia gas into said furrow through a discharge nozzle that is biased downwardly to maintain engagement with a bottom of said furrow.

11. The method of claim 10 in which said ammonia gas is discharged onto at least one of a bottom and side walls of said furrow.

12. The method of claim 10 in which said ammonia gas is discharged into said furrow through a delivery tube and discharge nozzle made of non-metallic material.

13. The method of claim 12 in which said non-metallic material is polymeric material.

14. The method of claim 12 in which said ammonia gas is allowed to expand within said discharge nozzle before being discharged from said nozzle.

* * * * *